(12) United States Patent
Oowaki (10) Patent No.: US 8,194,048 B2
(45) Date of Patent: Jun. 5, 2012

(54) LIQUID CRYSTAL DISPLAY DEVICE (75) Inventor: Yoshio Oowaki, Mobara (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 689 days.

(21) Appl. No.: 12/289,886

(22) Filed: Nov. 6, 2008

(65) Prior Publication Data
US 2009/0115743 A1    May 7, 2009

(30) Foreign Application Priority Data

Nov. 7, 2007   (JP) .................................. 2007-289740

(51) Int. Cl.
*G06F 3/045*   (2006.01)
(52) U.S. Cl. ......... 345/174; 345/173; 345/176; 345/104
(58) Field of Classification Search .................. None
See application file for complete search history.

(56) References Cited

U.S. PATENT DOCUMENTS
2009/0096759 A1*   4/2009   Nishiwaki et al. ............ 345/173

FOREIGN PATENT DOCUMENTS
JP          2005-38231          7/2003

* cited by examiner

*Primary Examiner* — Muhammad N Edun
(74) *Attorney, Agent, or Firm* — Stites & Harbison, PLLC; Juan Carlos A. Marquez, Esq (57) ABSTRACT

To realize an increase in an image quality of a liquid crystal display device having a capacitive touch screen, and an increase in are liability of a contact surface and a connection portion. A capacitive touch screen 50 and a liquid crystal display panel 30 are connected, by the same flexible wiring substrate 70, on an interior side when the touch screen 50 and the liquid crystal display panel 30 are laid one on top of the other. By so doing, a terminal is protected from an exterior, and an increase in a number of components is suppressed. Also, by installing the capacitive touch screen 50 on a color filter substrate 20 side of the liquid crystal display panel 30, a reduction of a contrast is prevented. Furthermore, a capacitive touch screen substrate 51 side is made a contact surface for an input. By so doing, a conductive layer 52 of the capacitive touch screen 50 is prevented from tearing due to an abrasion caused by a contact.

5 Claims, 10 Drawing Sheets

LIQUID CRYSTAL DISPLAY DEVICE

CROSS-REFERENCE TO RELATED APPLICATION

The present application claims priority from Japanese application JP2007-289740 filed on Nov. 7, 2007, the content of which is hereby incorporated by reference into this application.

BACKGROUND OF THE INVENTION

1. Technical Field

The present invention relates to a display device, and particularly relates to a liquid crystal display device having a touch screen.

2. Related Art

As a liquid crystal display device can be made compact and slimline, applications are expanding into various fields. A mobile telephone, a PDA, and the like, are examples thereof. In these apparatus, a method wherein a touch screen is used as an input device is expanding. Although there is a static capacitance coupling type, a resistance type, and the like, of touch screen, a configuration in which a resistance type touch screen is used as an input device of a liquid crystal display device is described in JP-A-2005-38231.

In JP-A-2005-38231, a configuration is described in which, by using the same flexible wiring substrate as a flexible wiring substrate which connects the touch screen and an external circuit, and a flexible wiring substrate which connects a liquid crystal display panel and the external circuit, a component cost of a connection with the external circuit is reduced. Also, in JP-A-2005-38231, a configuration is described in which, by using the flexible wiring substrate folded back, an overall size of the display device is reduced.

Figure 10:
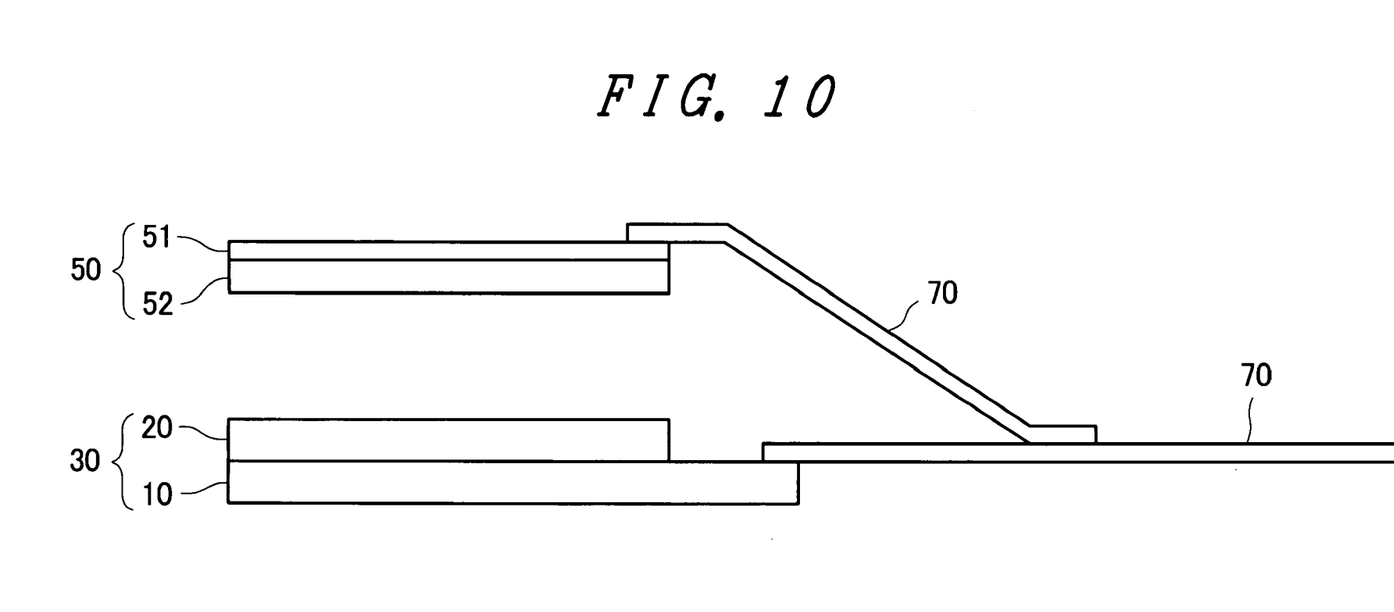
FIG. 10 is a heretofore known example of a liquid crystal display device with touch screen.

FIG. 10 is a schematic view of a heretofore known liquid crystal display device with touch screen. In FIG. 10, a resistance, a capacity, and the like, for a position detection being formed in a touch screen 50, a flexible wiring substrate 70, for connecting to a detection circuit for determining a position, is connected.

Meanwhile, a flexible wiring substrate 70 is attached to a liquid crystal display panel 30 in order to supply a power source, and supply an image signal to a pixel. Consequently, to date, both the flexible wiring substrate 70 for the touch screen 50, and the flexible wiring substrate 70 for the liquid crystal display panel 30, have been necessary.

Figure 11:
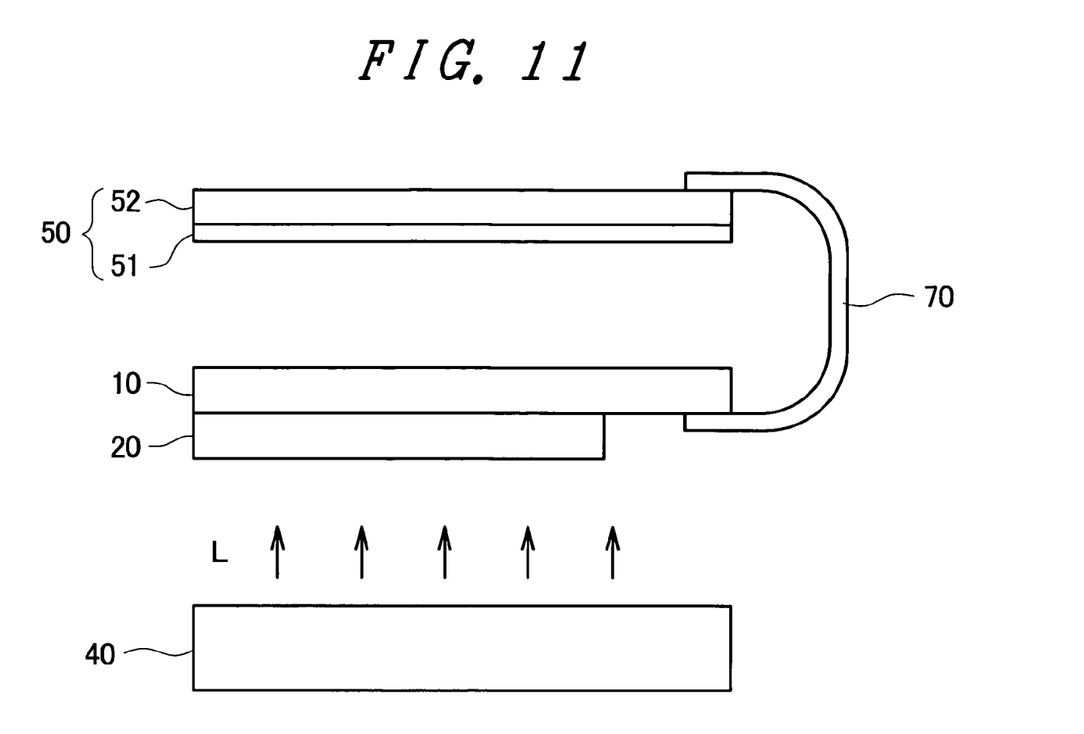
FIG. 11 is another heretofore known example of the liquid crystal display device with touch screen.

A configuration which, not using a flexible wiring substrate 70 for each of the touch screen 50 and the liquid crystal display panel 30, shares the flexible wiring substrate 70 for the touch screen 50 and the flexible wiring substrate 70 for the liquid crystal display panel 30, is as in FIG. 11. FIG. 11 is the same as the technology described in JP-A-2005-38231. In JP-A-2005-38231, the flexible wiring substrate 70 which connects the touch screen 50 and the liquid crystal display panel 30 extends in a direction perpendicular to the plane of the figure, connecting with an external circuit.

In FIG. 11, the touch screen 50 is configured of a front surface conductive layer 52, and a substrate. A protection layer 53 is formed on a front surface of the conductive layer 52. Although the touch screen 50 of JP-A-2005-38231 is a resistance type touch screen 50, FIG. 11 is a capacitive touch screen 50. The liquid crystal display panel 30 is configured of a TFT substrate 10, on which are formed pixel electrodes, thin film transistors (TFT's), image signal wires, scan signal wires, and the like, a color filter substrate 20, on which is formed a color filter and the like, and a liquid crystal layer sandwiched by the TFT substrate 10 and the color filter substrate 20.

A problem with the configuration shown in FIG. 11 is as follows. That is, a human touches the touch screen 50 with a finger, a touch screen 50 pen, or the like, but on being touched a large number of times, the thin protection layer 53 tears, the conductive layer 52 also tears, and the touch screen 50 ceases to function.

Another problem with the configuration shown in FIG. 11 is as follows. That is, as the liquid crystal display panel 30 is not light-emitting, a backlight 40 is necessary in order to display an image. With the kind of configuration of FIG. 11, a light L from the backlight 40 firstly, unlike with a regular liquid crystal display device, falls incident on the color filter substrate 20. Subsequently, a transmitted light is emitted, via the TFT substrate 10, on a touch screen 50 side.

With this kind of configuration, as a human sees an image from a TFT substrate 10 side, a contrast of the image deteriorates. That is, although it is possible to form a black matrix in order to raise the contrast on a color filter substrate 20 side, it is difficult to form a black matrix on the TFT substrate 10 side.

SUMMARY OF THE INVENTION

An object of the invention is to enable a structure in which, in a liquid crystal display device using the capacitive touch screen 50, the touch screen 50 is installed on the color filter substrate 20 side of the liquid crystal display device. Also, another object of the invention is to connect the liquid crystal panel and the touch screen 50 with the same flexible wiring substrate 70, reducing a number of components of a connection portion. Also, yet another object of the invention is to realize a compact liquid crystal display device with touch screen.

The invention, being contrived in order to achieve the heretofore described objects, adopts a configuration in which a capacitive touch screen is installed on a color filter substrate side of a liquid crystal display panel, the same flexible wiring substrate is used for the liquid crystal display panel and the touch screen, and a connection portion of the flexible wiring substrate and touch screen, as well as a connection portion of the flexible wiring substrate and liquid crystal display panel, are formed on an interior side. A specific method is as follows.

1. A liquid crystal display device in which a capacitive touch screen is placed on a liquid crystal display panel in which a liquid crystal layer is sandwiched by a TFT substrate, on which pixel electrodes and thin film transistors (TFT's) are formed in a matrix form, and a color filter substrate on which a color filter is formed, and which has a back light, wherein the capacitive touch screen is placed on the color filter substrate, the capacitive touch screen and the TFT substrate are connected by the same flexible wiring substrate, and the backlight is installed at a rear of the TFT substrate, and wherein a connection portion of the flexible wiring substrate and the TFT substrate is formed on an interior side of the TFT substrate, and a connection portion of the flexible wiring substrate and the capacitive touch screen is formed on an interior side of the capacitive touch screen.

2. The liquid crystal display device according to 1. wherein, in the capacitive touch screen, a substrate of the capacitive touch screen exists on an exterior side.

3. A liquid crystal display device in which a capacitive touch screen is placed on a liquid crystal display panel in which a liquid crystal layer is sandwiched by a TFT substrate, on which pixel electrodes and thin film transistors are formed in a matrix form, and a color filter substrate on which a color filter is formed, and which has a backlight, wherein the capacitive touch screen is placed on the color filter substrate, the capacitive touch screen and the TFT substrate are connected by the same flexible wiring substrate, and the backlight is installed at a rear of the TFT substrate, wherein a connection portion of the flexible wiring substrate and the TFT substrate is formed on an interior side of the TFT substrate, and a connection portion of the flexible wiring substrate and the capacitive touch screen is formed on an interior side of the capacitive touch screen, and wherein there exists a portion in the flexible wiring substrate in which is formed wiring connected only to the capacitive touch screen, and the flexible wiring substrate is folded at the portion in which is formed the wiring connected only to the capacitive touch screen.

4. The liquid crystal display device according to 3., wherein the flexible wiring substrate is folded to a rear surface of the liquid crystal display panel.

5. A liquid crystal display device in which a capacitive touch screen is placed on a liquid crystal display panel in which a liquid crystal layer is sandwiched by a TFT substrate, on which pixel electrodes and thin film transistors are formed in a matrix form, and a color filter substrate on which a color filter is formed, and which has a backlight, wherein the capacitive touch screen is placed on the color filter substrate, the capacitive touch screen and the TFT substrate are connected by the same flexible wiring substrate, and the backlight is installed at a rear of the TFT substrate, wherein a connection portion of the flexible wiring substrate and the TFT substrate is formed on an interior side of the TFT substrate, and a connection portion of the flexible wiring substrate and the capacitive touch screen is formed on an interior side of the capacitive touch screen, wherein there exist portions in the flexible wiring substrate segregated into a portion in which is formed wiring connected only to the capacitive touch screen, and a portion connected only to the liquid crystal display panel, and wherein the flexible wiring substrate is folded at each of the portions segregated into the portion in which is formed the wiring connected only to the capacitive touch screen, and the portion connected only to the liquid crystal display panel.

According to the invention, as it is possible to install the touch screen on the color filter substrate side of the liquid crystal display panel, it is possible to maintain the contrast of an image. Also, according to the invention, as the connection portion of the touch screen and flexible wiring substrate, as well as the connection portion of the liquid crystal display panel and flexible wiring substrate, are installed on the interior side, it is possible to increase a reliability of the connection portion. Also, as it is possible to share the flexible wiring substrate connected to the touch screen and the liquid crystal display panel, it is possible to reduce the number of components.

Furthermore, according to the invention, as the substrate of the touch screen is disposed on an exterior side, it is possible to protect the wiring of the touch screen. Furthermore, according to the invention, as it is possible to reduce a bending stress of the flexible wiring substrate, it is possible to realize a compact liquid crystal display device with touch screen.

DESCRIPTION OF THE PREFERRED EMBODIMENT(S)

Detailed contents of the invention will be disclosed, in accordance with embodiments.

First Embodiment

Figure 1:
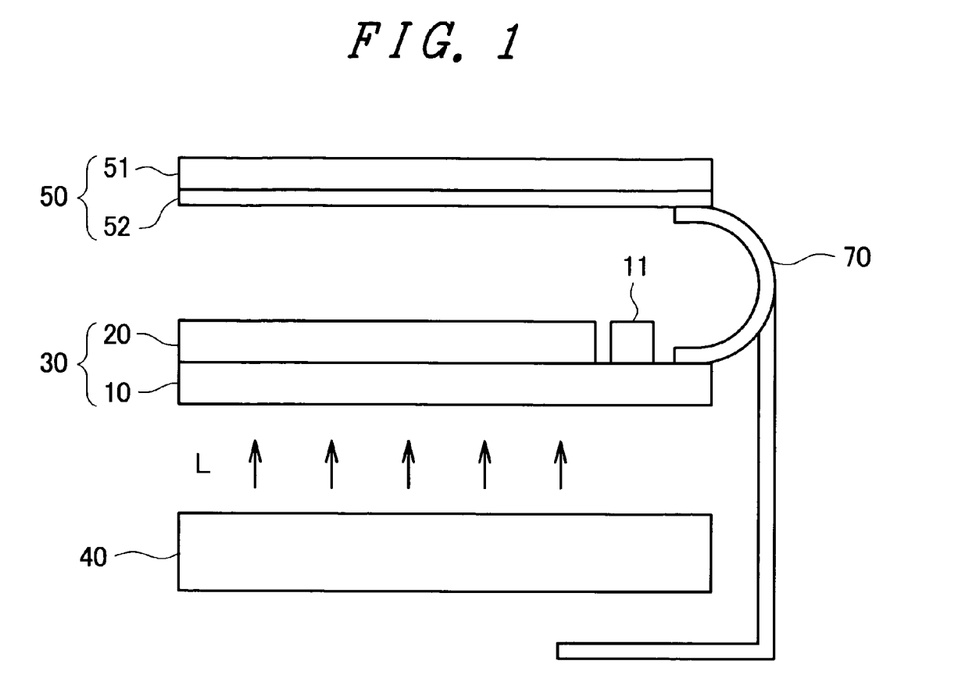
FIG. 1 is a schematic exploded sectional view of the invention.

FIG. 1 is a schematic sectional view of a liquid crystal display device with touch screen according to the invention. A touch screen 50 in the embodiment is a static capacitance coupling type of touch screen (hereafter called a capacitive touch screen) 50. An outline structure of the capacitive touch screen (the touch panel) 50 is that a conductive layer 52, configuring one portion of a position detection circuit, is formed on a transparent touch screen substrate 51. Although not shown in FIG. 1, the conductive layer 52 is covered with a protection layer.

One feature of the embodiment is that a surface touched with a human finger, or with a pen or the like, is a surface on a side opposite to a surface of the touch screen substrate on which the conductive layer 52 is formed. In the case of many capacitive touch screens 50, a human touches the conductive layer 52 side. Although the conductive layer 52 is covered with a protection layer, the protection layer tears on being repeatedly touched with a pen or the like, and by extension the conductive layer 52 also tears. As a result thereof, a function of the touch screen 50 is lost.

In the embodiment, by making the substrate side of the touch screen 50 the side which is touched from an exterior, the conductive layer formed on the touch screen is prevented from tearing. As the capacitive touch screen 50 in the embodiment detects a change in a capacity of a touched portion, by appropriately controlling a sensitivity and noise, a position can be detected even when an input is made on the touch screen substrate 51 side.

Consequently, the conductive layer 52 side of the touch screen 50 is affixed to a color filter substrate 20 side of a liquid crystal display panel 30. In actuality, the touch screen 50 is affixed to an upper polarizer of the liquid crystal display panel 30. It is possible to use an ultraviolet cure resin (a UV cure resin) in the affixing. By using a UV cure resin, it is possible to prevent a reflection at an interface of the liquid crystal display panel 30 and the touch screen 50.

The liquid crystal display panel 30 is configured of the color filter substrate 20, a TFT substrate 10, and a liquid crystal layer sandwiched between them. As a terminal for connecting with a flexible wiring substrate 70 for connecting with an external circuit, and a driver 11 for driving the liquid crystal display panel 30, are installed on the TFT substrate 10, it is formed larger than the color filter substrate 20.

As shown in FIG. 1, the touch screen 50 and the liquid crystal display panel 30 are connected by a common flexible wiring substrate 70. One portion of the flexible wiring substrate 70 extending to a rear of a backlight 40, a power source, a signal, and the like, for the touch screen 50 and the liquid crystal display panel 30 are received by this portion from the external circuit.

In FIG. 1, the backlight 40 is disposed on a back surface of the liquid crystal display panel 30. A light L from the backlight 40 falls incident on the TFT substrate 10. The backlight 40 includes unshown optical parts such as a light source, a diffusion plate or light guide plate, a diffusion sheet, and a prism sheet. As the side on which the touch screen 50 is installed is the color filter substrate 20 side, it is the same as viewing a regular liquid crystal display device. That is, by forming not only a color filter but also a black matrix on the color filter substrate 20, it is possible to increase a contrast.

Furthermore, as the terminal for connecting the touch screen 50 and the flexible wiring substrate 70 is formed on a side opposite to the side touched by a human, there is little danger of a connection portion of the touch screen 50 and the flexible wiring substrate 70 being broken. Also, as a connection of the liquid crystal display panel 30 and the flexible wiring substrate 70 is also between the touch screen 50 and the liquid crystal display panel 30, in the same way, there is little danger of a connection portion being broken. Thus, the configuration of FIG. 1 has a large number of advantages.

Figure 2:
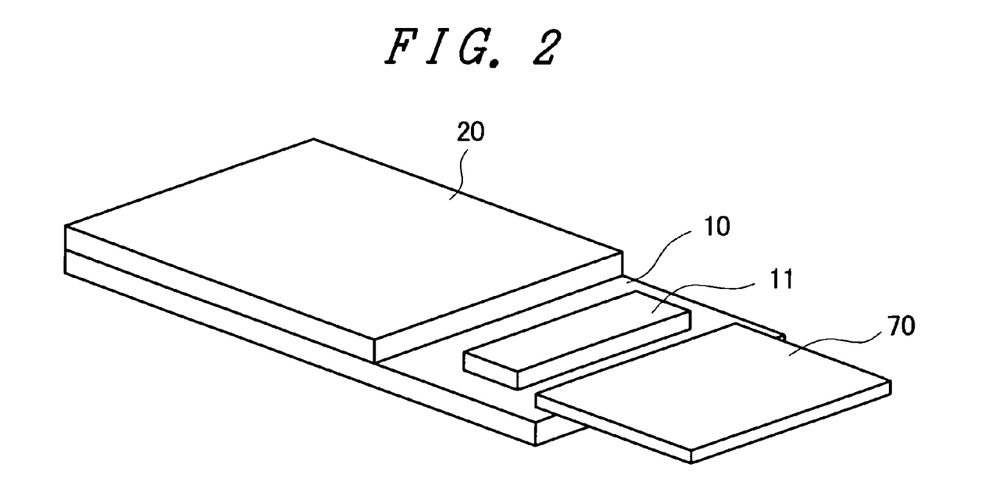
FIG. 2 is a perspective view of a liquid crystal display panel.

FIG. 2 is a schematic perspective view of the liquid crystal display panel 30. In FIG. 2, the color filter substrate 20 is laminated on the TFT substrate 10. An unshown liquid crystal layer is sealed in a slight gap of a few μm between the TFT substrate 10 and the color filter substrate 20. As the driver 11 for driving the liquid crystal display panel 30, and furthermore, the flexible wiring substrate 70 for supplying a power source and a signal to the liquid crystal display panel 30, are installed on the TFT substrate 10, the TFT substrate 10 is formed larger than the color filter substrate 20. The flexible wiring substrate 70 connected to the TFT substrate 10 is also connected to the terminal of the touch screen 50. As the flexible wiring substrate 70 of FIG. 2 is a schematic view, it is of a simple shape, but in actuality it has a complex shape, as will be described hereafter.

Figure 3A:
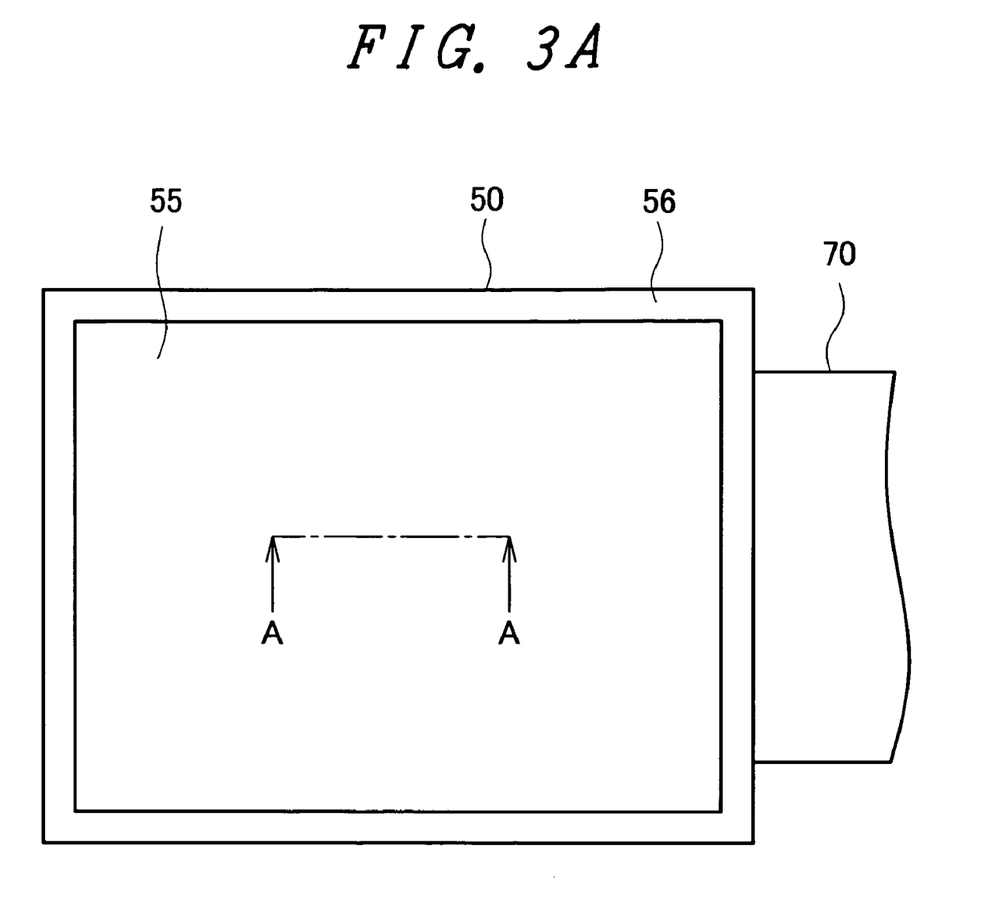
FIGS. 3A and 3B are schematic views of a capacitive touch screen.
Figure 3B:
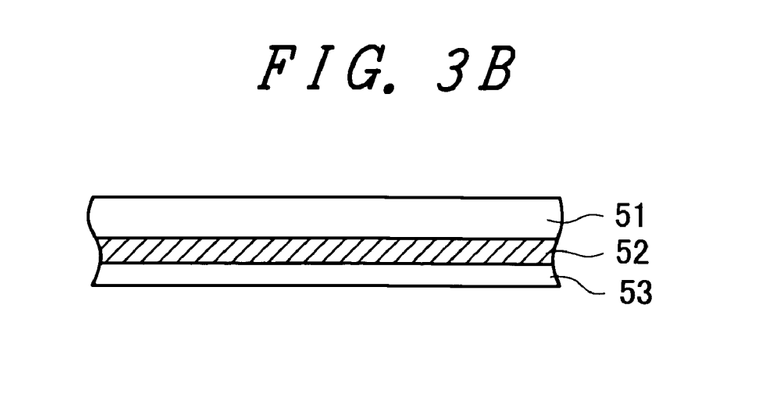

FIGS. 3A and 3B are schematic views of the capacitive touch screen 50. FIG. 3A is a plan view of the touch screen 50. Although a major portion of FIG. 3A is a display area 55, a frame portion 56 being formed on a periphery, a sensor, wiring and the like for a position detection are formed in this portion. Then, the flexible wiring substrate 70 is connected to the frame portion 56. This flexible wiring substrate 70 is the same as the flexible wiring substrate 70 connected to the liquid crystal display panel 30.

FIG. 3B is a sectional view along a line A-A of FIG. 3A. In FIG. 3B, a front surface, being the touch screen substrate 51, is a transparent substrate. Although it is generally formed of glass, as long as it is transparent, it is also acceptable that it is formed of a resin. In the case of forming it with a resin, it is possible to use acryl, polycarbonate, or the like.

The transparent conductive layer 52 is formed on the touch screen substrate 51. A capacity, a resistance, a wiring, and the like, for a position detection are formed by the transparent conductive layer 52. In the embodiment, the side touched by a human being the touch screen substrate 51, there is a little danger of the transparent conductive layer 52 tearing.

The transparent conductive layer 52 is protected by a protection layer 53 of silicon dioxide, silicon nitride, or the like. Then, an unshown UV cure resin is applied to the protection layer 53, and it is affixed to the liquid crystal display panel 30. The UV cure resin being originally a liquid, the combining with the liquid crystal display panel 30 is carried out in vacuum, preventing air bubbles or the like from being trapped inside the UV cure resin.

Figure 4:
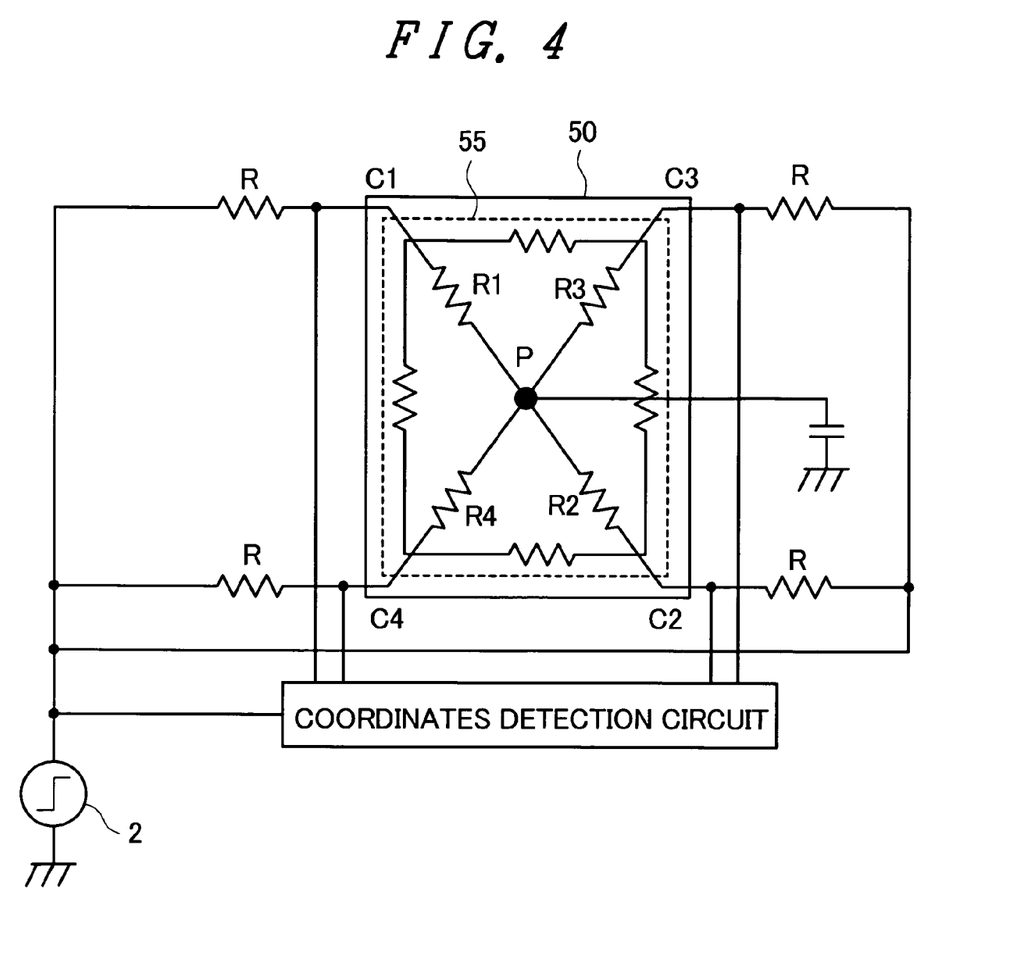
FIG. 4 is a circuit diagram of the capacitive touch screen.

FIG. 4 shows a principle of a position detection in the capacitive touch screen 50. A resistance and a capacity are formed uniformly in the touch screen 50. That is, as shown by an equivalent circuit in FIG. 4, an internal resistance is formed on a front surface of the touch screen. A pulse voltage is applied regularly from each node (C1, C2, C3 and C4) of four corners (top right, bottom right, top left and bottom left) of the touch screen 50. A way in which the pulse voltage is conveyed is detected, and a position is determined. The pulse voltages are of the same potential and the same phase. For example, in FIG. 4, in the event of touching a point P, a capacity of the point P changes. A speed at which the pulse applied from each node of the corner portions (hereafter called the corners) (C1, C2, C3 and C4) is conveyed differs due to the change in capacity, and a position detection becomes possible.

The pulse voltage (or an alternating voltage) is generated by an alternating voltage generation circuit 2. The pulse voltage changes due to an effect of a resistance (R), an internal resistance of the transparent conductive layer 52, a parasitic capacity (not shown) added to the transparent conductive layer 52, and a capacity component possessed by a finger or a contact member, such as a touch pen. That is, at the position P at which the contact member makes contact, voltage waveforms appearing at each corner (C1, C2, C3 and C4) are voltage waveforms having differing time constants. The voltage waveforms appearing at each corner (C1, C2, C3 and C4) are input into a coordinate detection circuit. The coordinate detection circuit detects the position P based on the input corners (C1, C2, C3 and C4).

Figure 5A:
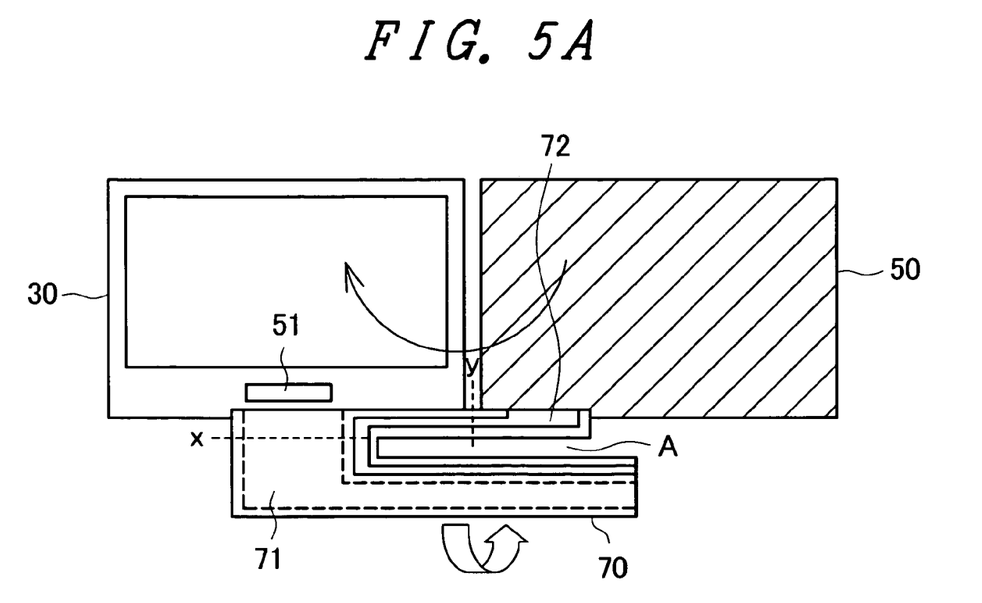
FIGS. 5A and 5B are plan views of a first embodiment.
Figure 5B:
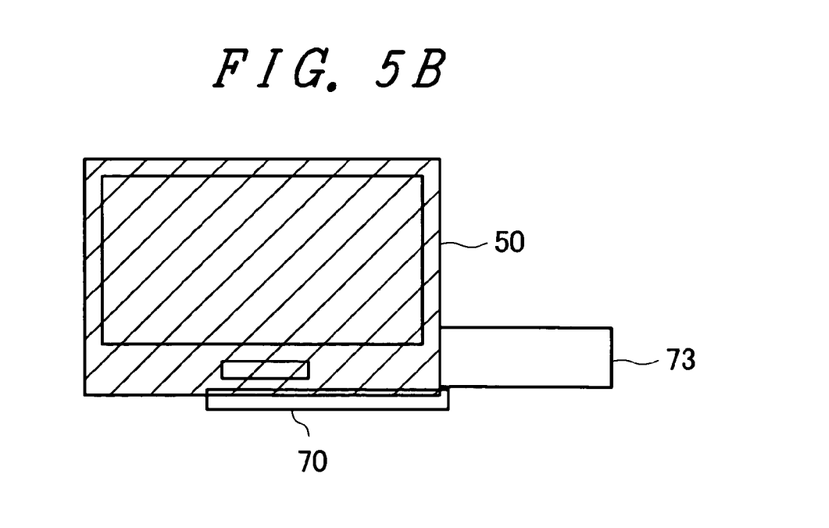

FIGS. 5A and 5B are plan views of the embodiment. FIG. 5A shows a condition in which the liquid crystal display panel 30, the touch screen 50, and the flexible wiring substrate 70 are connected, while FIG. 5B shows a plan view of the liquid crystal display device. However, as FIG. 5B is a plan view, only the touch screen 50 is visible. In FIG. 5A, the flexible wiring substrate 70 is connected to both the liquid crystal display panel 30 and the touch screen 50.

From the condition in which the liquid crystal display panel 30 and the touch screen 50 are connected by the flexible wiring substrate 70, as heretofore described, the flexible wiring substrate 70 is folded along a dashed line y of FIG. 5A, laying the liquid crystal display panel 30 and touch screen 50 one on top of the other. The fold line y becomes a valley fold. Although the word "fold" is used in the embodiment, this also includes a case of folding back with a certain radius.

Subsequently, on the flexible wiring substrate 70 being folded to a rear of the liquid crystal display panel 30 along a dashed line x, the liquid crystal display device shown in FIG. 5B is completed. The dashed line x is a mountain fold. The liquid crystal display device shown in the embodiment is also compact planarly, as shown in FIG. 5B. In this case, it is possible to realize a compact liquid crystal display device by folding the flexible wiring substrate 70 to the rear of the backlight of the liquid crystal display panel 30. The same applies to the following embodiments. A connection is made to an external circuit, a power source, and the like, with an extremity 73 of the flexible wiring substrate 70 jutting out on the right side in FIG. 5B. It is acceptable to shorten the terminal 73 of the flexible wiring substrate 70 as necessary.

In FIG. 5A, a notch A is formed in the flexible wiring substrate 70 in order that the fold y can be easily made. That is, while there are around ten wires formed in the flexible wiring substrate 70 for the touch screen 50, there are more, around forty, wires formed in the flexible wiring substrate 70 for the liquid crystal display panel 30. Consequently, in the event that there were only the wires for the touch screen 50, it would be possible to make the flexible wiring substrate narrower. In FIG. 5A, as the notch A is formed in the flexible wiring substrate 70, it is sufficient, for the fold y, to fold only a narrow flexible wiring substrate 70 wiring portion. Consequently, the folding being easy, it is also possible to make a stress acting on the flexible wiring substrate 70 smaller.

Also as, by forming the notch A in the flexible wiring substrate 70, the flexible wiring substrate 70 is narrow at the fold portion when carrying out the fold x too, the folding is easy. When carrying out the fold x, it is advisable that a position of the fold is, as far as possible, such as to fold in a direction perpendicular to the wiring formed in the flexible wiring substrate 70. By this means, it is possible to alleviate a bending stress caused by the wiring.

FIG. 5B is a view in which the flexible wiring substrate 70 is folded, and the touch screen 50 is installed on the liquid crystal display panel 30. In this case, the touch screen 50 is affixed to the color filter substrate 20 of the liquid crystal display panel 30. As shown in FIG. 5B, the flexible wiring substrate 70 having almost no effect on an external form of the liquid crystal display device, it is possible to realize a compact liquid crystal display device.

Another characteristic of the embodiment is that a connection portion of the flexible wiring substrate 70 and the touch screen 50, or of the flexible wiring substrate 70 and the liquid crystal display panel 30, is formed on an interior side when the touch screen 50 and the liquid crystal display panel 30 are laid one on top of the other. Consequently, it being possible to mechanically protect the connection portion from the exterior, it is possible to increase a reliability of a whole of the liquid crystal display device. Furthermore, by adopting the kind of configuration of the embodiment, it being possible to install the backlight in the rear of the TFT substrate 10 of the liquid crystal display panel 30, it is possible to maintain an image contrast characteristic. In FIG. 5B, it goes without saying that it is possible to make the extremity 73 of the flexible wiring substrate 70, jutting out in a sideways direction from the liquid crystal display device, smaller as necessary.

Second Embodiment

Figure 6A:
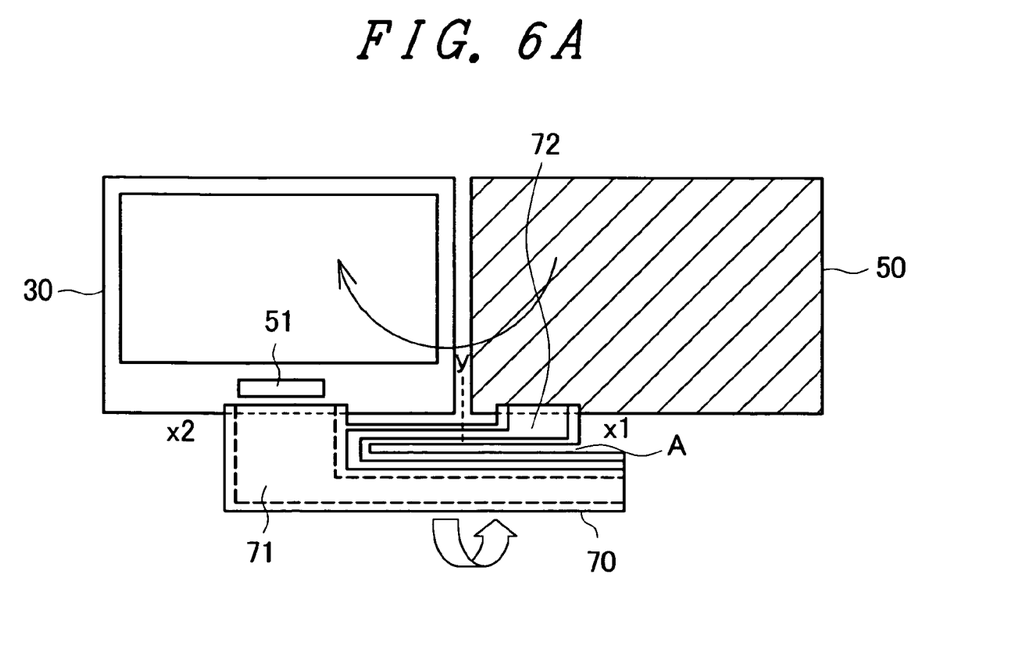
FIGS. 6A and 6B are plan views of a second embodiment.
Figure 6B:
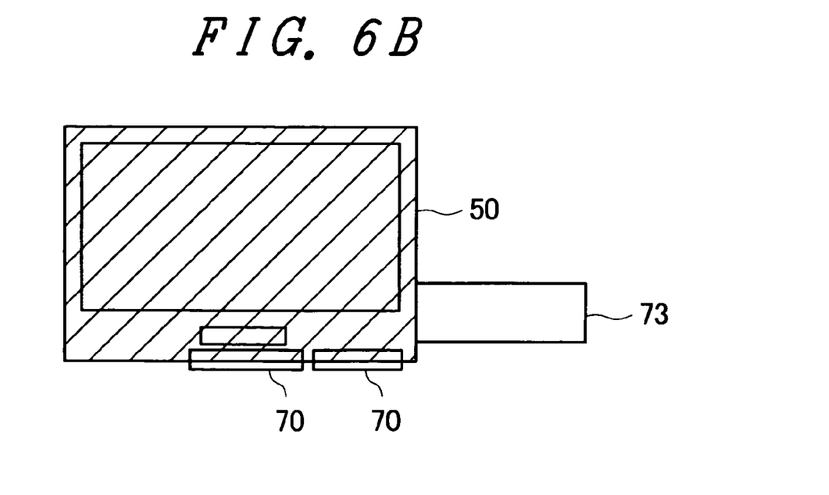

FIGS. 6A and 6B are a second embodiment of the invention. FIG. 6A is a plan view of the liquid crystal display panel 30 and the touch screen 50 before stacking, while FIG. 6B is a plan view of the liquid crystal display panel 30 and the touch screen 50 after stacking. In the flexible wiring substrate 70 of FIG. 6A, the wiring for the liquid crystal display panel 30 is formed on a rear side, and the wiring for the touch screen 50 on a front side.

In FIG. 6A, firstly, the flexible wiring substrate 70 is folded along the dashed line y, and the liquid crystal display panel 30 and touch screen 50 are laid one on top of the other. At this time, only a narrow portion of the flexible wiring substrate 70, in which only the wiring for the touch screen 50 is formed, is folded. Consequently, the bending stress is small.

After the liquid crystal display panel 30 and touch screen 50 are laid one on top of the other, the flexible wiring substrate 70 is folded to the rear of the liquid crystal display panel 30 along x1 and x2. In a portion in which the flexible wiring substrate 70 is folded along x1 and x2, the flexible wiring substrate 70 is separated into a portion in which the wiring for the touch screen 50 is formed, and a portion in which the wiring for the liquid crystal display panel 30 is formed.

By adopting this kind of configuration, it is possible to reduce the bending stress of the flexible wiring substrate 70 in a bend portion of x1 and x2. That is, it is possible to reduce a bend radius of the flexible wiring substrate 70. Consequently, it is possible to make an external form of the liquid crystal display panel 30 with touch screen of the second embodiment even smaller than in the case of the first embodiment.

In this embodiment too, the connection portion of the flexible wiring substrate 70 and the touch screen 50, or of the flexible wiring substrate 70 and the liquid crystal display panel 30, is formed on the interior side when the touch screen 50 and the liquid crystal display panel 30 are laid one on top of the other. Consequently, it being possible to mechanically protect the connection portion from the exterior, it is possible to increase the reliability of the whole of the liquid crystal display apparatus. Furthermore, by adopting the kind of configuration of the embodiment, it being possible to install the backlight in the rear of the TFT substrate 10 of the liquid crystal display panel 30, it is possible to maintain the image contrast characteristic. In FIG. 6B, it goes without saying that it is possible to make the extremity 73 of the flexible wiring substrate 70, jutting out in a sideways direction from the liquid crystal display apparatus, smaller as necessary. This kind of characteristic is the same too in a third embodiment and fourth embodiment, to be described hereafter.

Third Embodiment

Figure 7A:
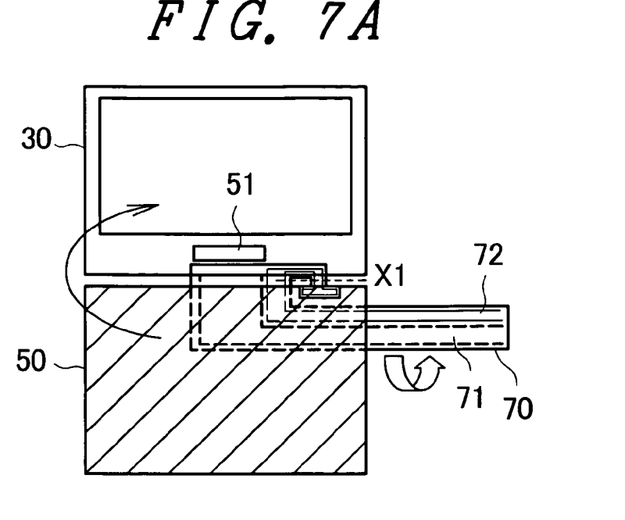
FIGS. 7A, 7B and 7C are plan views of a third embodiment.
Figure 7B:
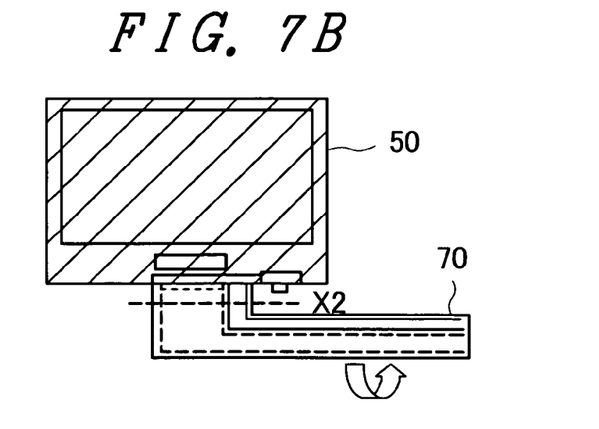
Figure 7C:
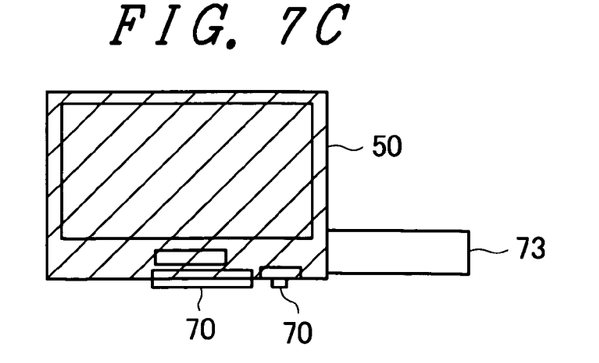

FIGS. 7A, 7B and 7C are a third embodiment of the invention.

FIG. 7A is a plan view of the liquid crystal display panel 30 and the touch screen 50 before stacking, FIG. 7B is a plan view of the liquid crystal display panel 30 and the touch screen 50 after stacking, and FIG. 7C is a plan view after folding the flexible wiring substrate 70 to the rear side of the liquid crystal display panel 30. In the flexible wiring substrate 70 of FIG. 7A, the wiring for the liquid crystal display panel 30 and the wiring for the touch screen 50 are formed on the same surface side. Furthermore, the flexible wiring substrate 70 is connected to a front surface side of the liquid crystal display panel 30 and a rear surface side of the touch screen 50. The front surface is called an observer side, while the rear surface is called a backlight side.

In FIG. 7A, the liquid crystal display panel 30 and touch screen 50 are laid one on top of the other by folding the flexible wiring substrate 70 along x1. In this case too, as the flexible wiring substrate 70, in a portion in which it is folded, is separated into a portion in which touch screen wiring 72 is formed, and a portion in which liquid crystal display panel wiring 71 is formed, it is possible to reduce the bending stress of the flexible wiring substrate 70. FIG. 7B is a plan view showing a condition in which the liquid crystal display panel 30 and the touch screen 50 are laid one on top of the other. FIG. 7C is a plan view when the flexible wiring substrate 70 is further folded, along x2, to the rear side of the backlight. By so doing, it is possible to make an external form of the liquid crystal display apparatus with touch screen smaller too, in the same way as in the second embodiment.

Figure 8A:
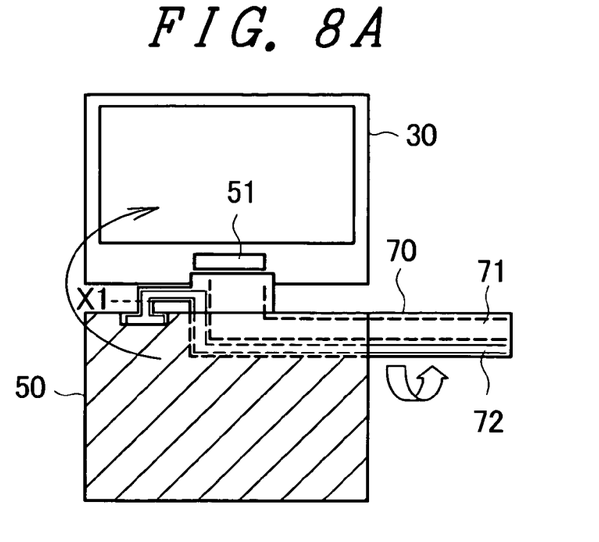
FIGS. 8A, 8B and 8C are plan views of another aspect of the third embodiment.
Figure 8B:
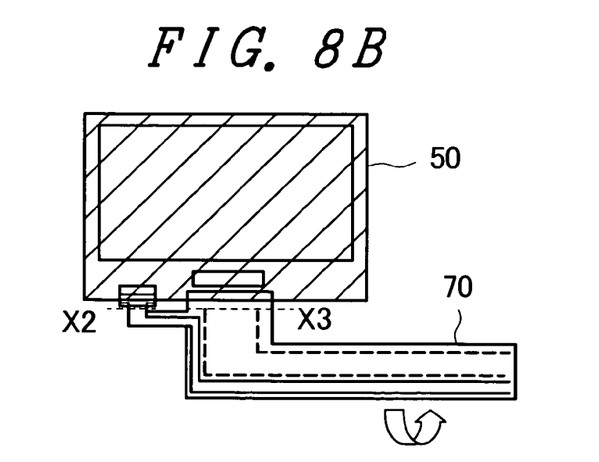
Figure 8C:
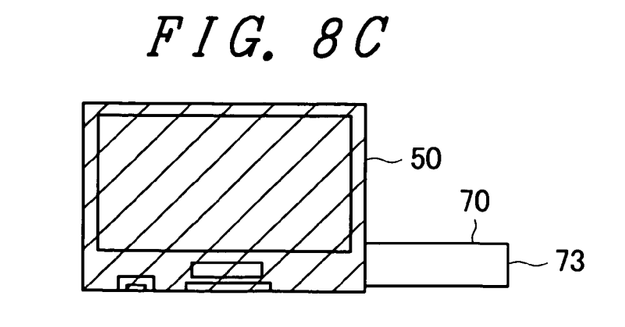

FIGS. 8A, 8B and 8C are a second aspect of the embodiment. With a display apparatus of FIGS. 8A, 8B and 8C, a gap between the liquid crystal display panel 30 and the touch screen 50 is made larger, making a handling easier. FIG. 8A is a plan view of the liquid crystal display panel 30 and the touch screen 50 before stacking, FIG. 8B is a plan view of the liquid crystal display panel 30 and the touch screen 50 after stacking, and FIG. 8C is a plan view after folding the flexible wiring substrate 70 to the rear side of the liquid crystal display panel 30. In the flexible wiring substrate 70 of FIG. 8A, the wiring for the liquid crystal display panel 30 and the wiring for the touch screen 50 are formed on the same surface side. Furthermore, the flexible wiring substrate 70 is connected to the front surface side of the liquid crystal display panel 30 and the rear surface side of the touch screen 50.

In the flexible wiring substrate 70, the portion in which only the touch screen wiring 72 is formed is folded at the dashed line x1 and the dashed line x2. As the portion of the flexible wiring substrate 70 in which only the touch screen wiring 72 is formed is narrow, there is no large stress. x1 is a valley fold, while x2 is a mountain fold. Also, a portion of the flexible wiring substrate 70 in which only the liquid crystal display panel wiring 71 is formed is folded at a dashed line x3. In the embodiment, a plan view of the liquid crystal display panel 30 and the touch screen 50 laid one on top of the other is as FIG. 8C.

Fourth Embodiment

Figure 9A:
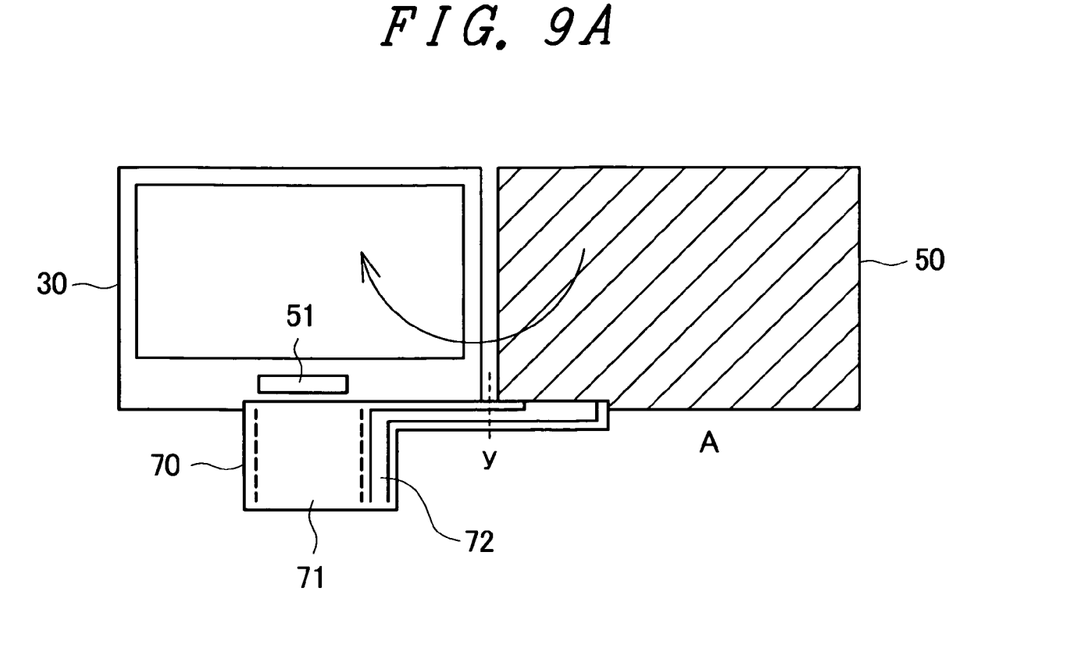
FIGS. 9A and 9B are plan views of a fourth embodiment.
Figure 9B:
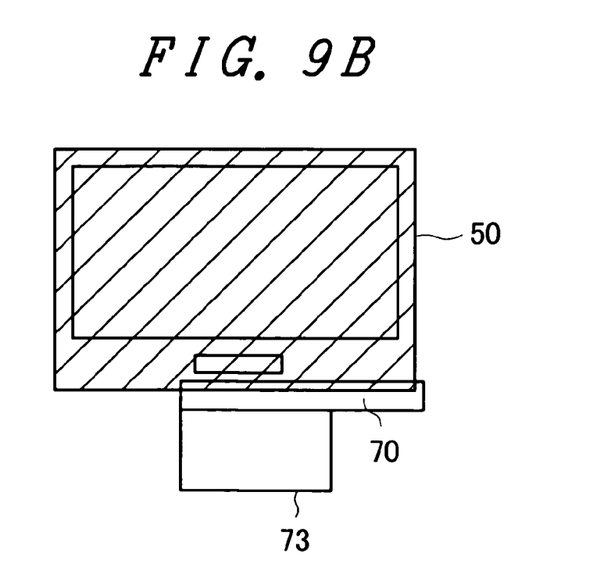

FIGS. 9A and 9B are a fourth embodiment of the invention. FIG. 9A is a plan view of the liquid crystal display panel 30 and the touch screen 50 before stacking, while FIG. 9B is a plan view of the liquid crystal display panel 30 and the touch screen 50 after stacking. In the flexible wiring substrate 70 of FIG. 9A, the wiring for the liquid crystal display panel 30 is formed on the rear side, and the wiring for the touch screen 50 on the front side.

In FIG. 9A, the flexible wiring substrate 70 is folded along the dashed line y in the portion of the flexible wiring substrate 70 in which only the touch screen wiring 72 is formed, and the liquid crystal display panel 30 and touch screen 50 are laid one on top of the other. In this case too, as the portion of the flexible wiring substrate 70 in which only the touch screen wiring 72 is formed is narrow, the bending stress is small.

In the embodiment, the flexible wiring substrate 70 is folded in only one place, the dashed line y. FIG. 9B is a plan view of the condition in which the liquid crystal display panel 30 and touch screen 50 are laid one on top of the other. In FIG. 9B, the extremity 73 of the flexible wiring substrate 70 exists below the liquid crystal display apparatus. The embodiment is adapted to a case in which, although there is a limit to a space in the sideways direction from the liquid crystal display apparatus, there is leeway in a vertical direction.

In the heretofore described first embodiment to fourth embodiment, it is acceptable either that the wiring of the flexible wiring substrate 70 is formed on one side, or that it is formed on both sides. In the event of forming the wiring for the liquid crystal display panel 30 on the rear side, and the wiring for the touch screen 50 on the front side, a through hole is provided in the flexible wiring substrate 70, and a terminal is formed on an opposite surface. Furthermore, the flexible wiring substrate 70 is disposed on the rear side of the touch screen 50.

As heretofore described, according to the invention, as it is possible to install the touch screen 50 on the color filter substrate 20 side of the liquid crystal display panel 30, and also possible to form the connection of the flexible wiring substrate 70 and the touch screen 50, or of the flexible wiring substrate 70 and the liquid crystal display panel 30, on the interior side of the liquid crystal display apparatus, it is possible to mechanically protect the terminal from the exterior.

Furthermore, as it is possible to make the bending stress of the flexible wiring substrate 70 smaller in the event of folding the flexible wiring substrate 70, forming the whole of the liquid crystal display apparatus compactly, it is possible to increase a reliability of a whole of the liquid crystal display panel 30.

What is claimed is:

1. A liquid crystal display device in which a capacitive touch screen is placed on a liquid crystal display panel in which a liquid crystal layer is sandwiched by a TFT substrate, on which pixel electrodes and thin film transistors are formed in a matrix form, and a color filter substrate on which a color filter is formed, and which has a backlight, wherein the capacitive touch screen is placed on the color filter substrate, the capacitive touch screen and the TFT substrate are connected by the same flexible wiring substrate, and the backlight is installed at a rear of the TFT substrate, and wherein a conductive layer is formed on the capacitive touch screen, the conductive layer having a first surface on the capacitive touch screen and an opposing surface facing the liquid crystal display panel, a first connection portion of the flexible wiring substrate is formed on a side of the TFT substrate facing the capacitive touch screen, a second connection portion of the flexible wiring substrate is formed on the opposing surface of the conductive layer.

2. The liquid crystal display device according to claim 1, wherein a substrate of the capacitive touch screen exists on an exterior side.

3. A liquid crystal display device in which a capacitive touch screen is placed on a liquid crystal display panel in which a liquid crystal layer is sandwiched by a TFT substrate, on which pixel electrodes and thin film transistors are formed in a matrix form, and a color filter substrate on which a color filter is formed, and which has a backlight, wherein the capacitive touch screen is placed on the color filter substrate, the capacitive touch screen and the TFT substrate are connected by the same flexible wiring substrate, and the backlight is installed at a rear of the TFT substrate, wherein a conductive layer is formed on the capacitive touch screen, the conductive layer having a first surface on the capacitive touch screen and an opposing surface facing the liquid crystal display panel, a first connection portion of the flexible wiring substrate is formed on a side of the TFT substrate facing the capacitive touch screen, a second connection portion of the flexible wiring substrate is formed on the opposing surface of the conductive layer, and wherein there exists a portion in the flexible wiring substrate in which is formed wiring connected only to the capacitive touch screen, and the flexible wiring substrate is folded at the portion in which is formed the wiring connected only to the capacitive touch screen.

4. The liquid crystal display device according to claim 3, wherein the flexible wiring substrate is folded to a rear surface of the liquid crystal display panel.

5. A liquid crystal display device in which a capacitive touch screen is placed on a liquid crystal display panel in which a liquid crystal layer is sandwiched by a TFT substrate, on which pixel electrodes and thin film transistors are formed in a matrix form, and a color filter substrate on which a color filter is formed, and which has a backlight, wherein the capacitive touch screen is placed on the color filter substrate, the capacitive touch screen and the TFT substrate are connected by the same flexible wiring substrate, and the backlight is installed at a rear of the TFT substrate, wherein a conductive layer is formed on the capacitive touch screen, the conductive layer having a first surface on the capacitive touch screen and an opposing surface facing the liquid crystal display panel, a first connection portion of the flexible wiring substrate is formed on a side of the TFT substrate facing the capacitive touch screen,
a second connection portion of the flexible wiring substrate is formed on the opposing surface of the conductive layer, wherein
there exist portions in the flexible wiring substrate segregated into a portion in which is formed wiring connected only to the capacitive touch screen, and a portion in which is formed wiring connected only to the liquid crystal display panel, and wherein
the flexible wiring substrate is folded at each of the portions segregated into the portion in which is formed the wiring connected only to the capacitive touch screen, and the portion in which is formed the wiring connected only to the liquid crystal display panel.

* * * * *